April 11, 1939.  I. KITROSER  2,153,718
NAVIGATION APPARATUS FOR AIRCRAFT
Filed July 27, 1935  3 Sheets-Sheet 1
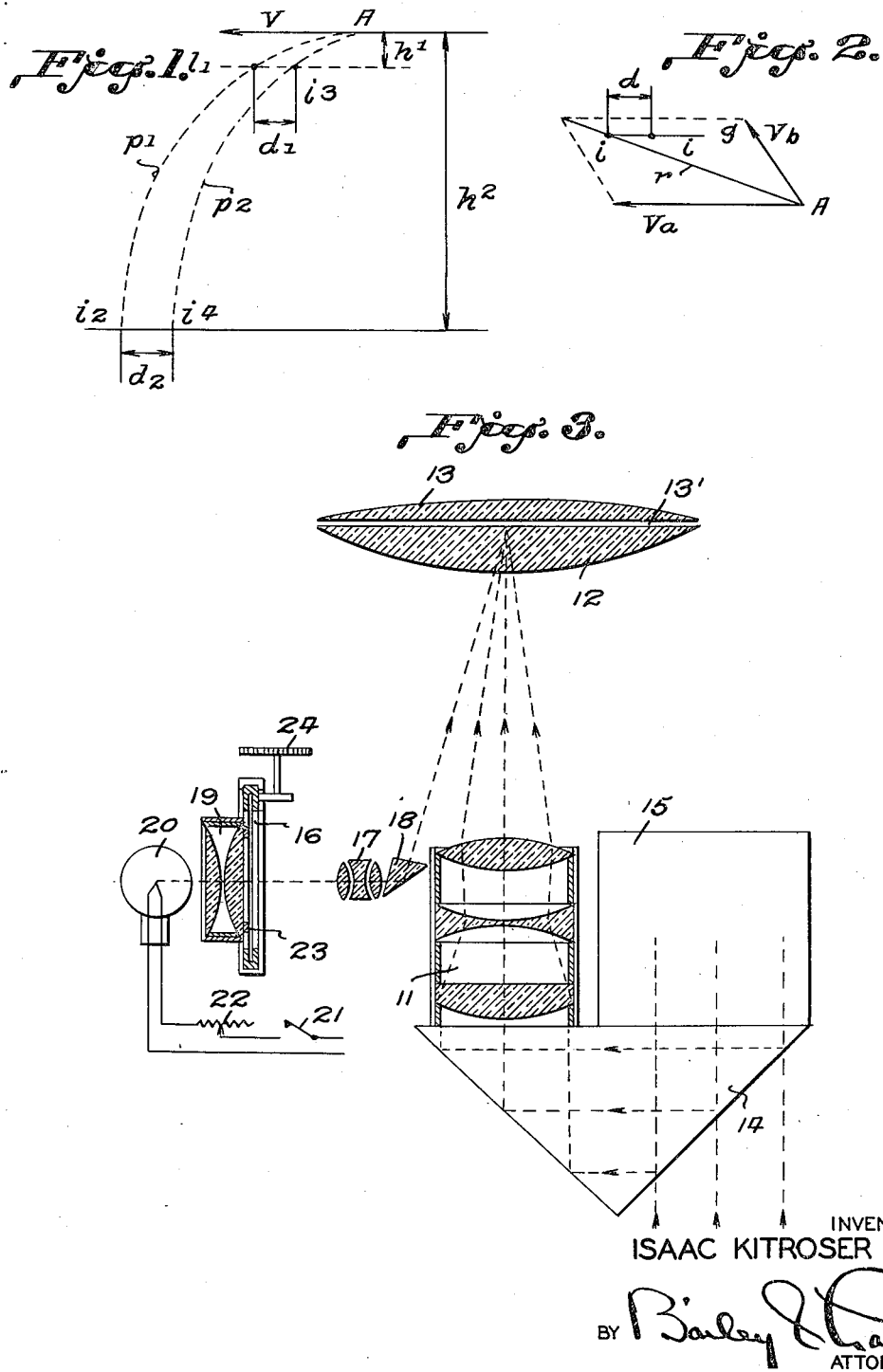
INVENTOR
ISAAC KITROSER April 11, 1939.                I. KITROSER                2,153,718
                    NAVIGATION APPARATUS FOR AIRCRAFT
                        Filed July 27, 1935           3 Sheets-Sheet 2
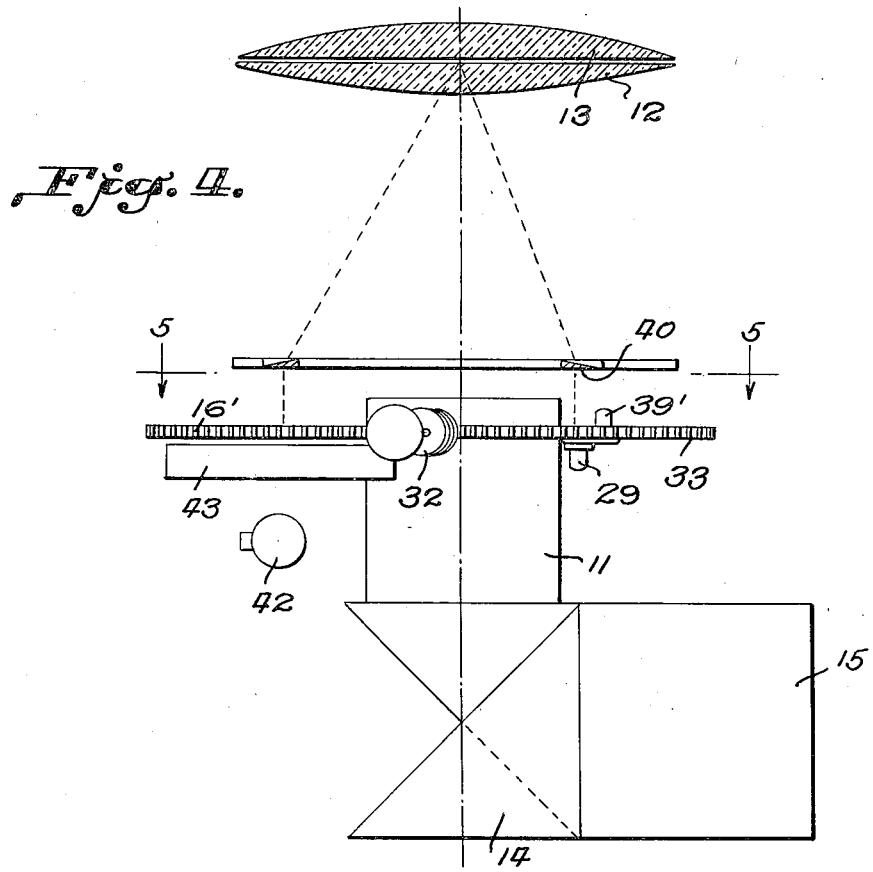
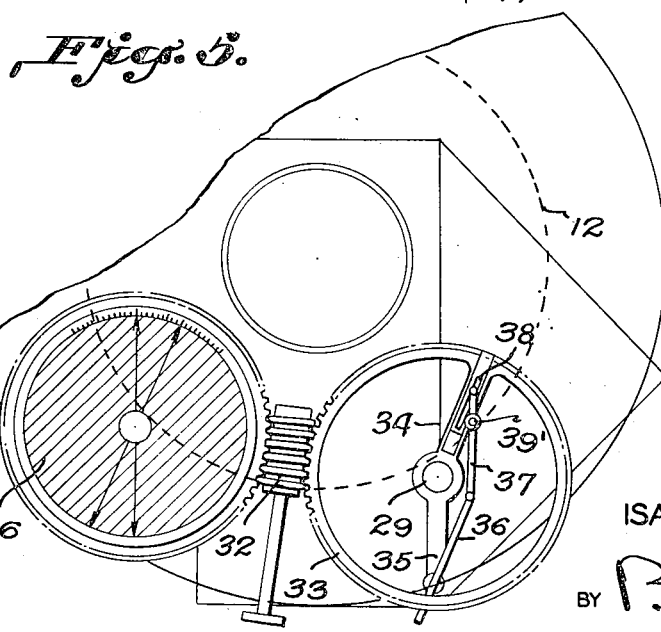
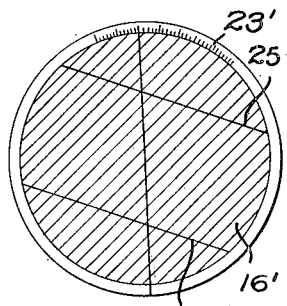
INVENTOR
ISAAC KITROSER April 11, 1939.    I. KITROSER    2,153,718
NAVIGATION APPARATUS FOR AIRCRAFT
Filed July 27, 1935    3 Sheets-Sheet 3
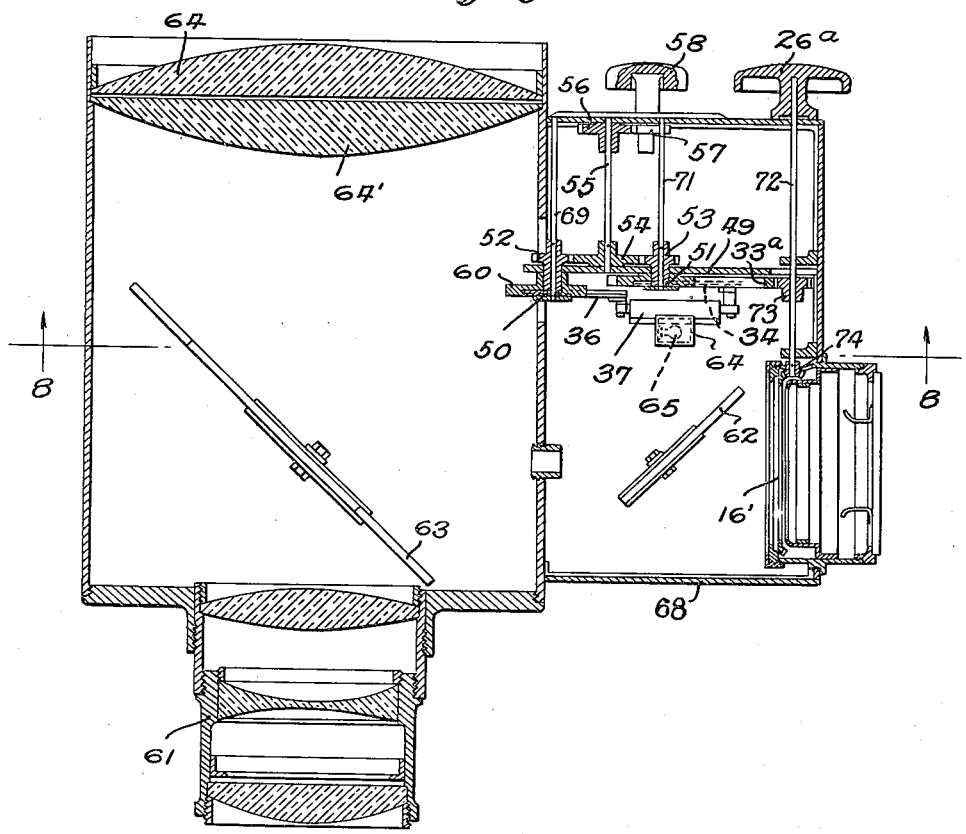
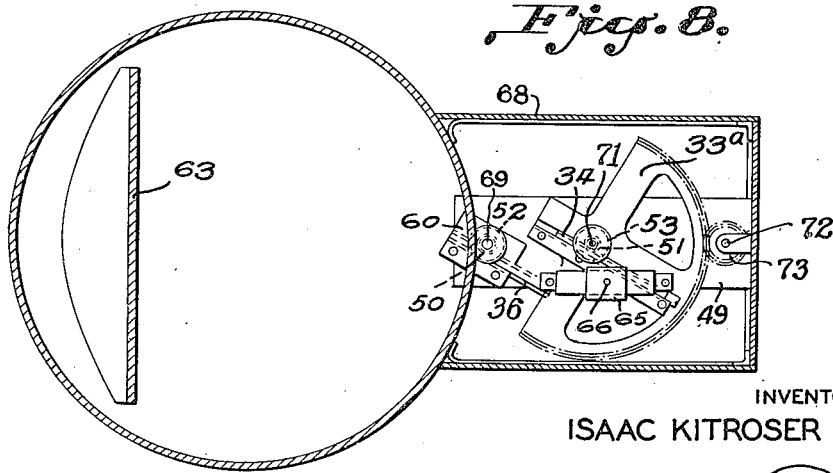
INVENTOR
ISAAC KITROSER
ATTORNEYS Patented Apr. 11, 1939

2,153,718

UNITED STATES PATENT OFFICE 2,153,718

NAVIGATION APPARATUS FOR AIRCRAFT

Isaac Kitroser, Viroflay, France, assignor to Société Bronzavia, Paris, France, a society of France Application July 27, 1935, Serial No. 33,605
In France July 31, 1934

7 Claims. (Cl. 88—1)

The present invention relates to navigation apparatus for aircraft and especially apparatus making it possible to determine the point on the ground where an object dropped from an aircraft at a given time will reach said ground.

The object of the present invention is to provide an apparatus of this kind which constantly indicates, on an image of the ground, the point at which said object would strike the ground if dropped at the time at which said point is indicated on said image.

The essential feature of the present invention consists in optically superposing an image of the ground, an image of a member movable with respect to the aircraft and adapted to act as the sighting element of a drift indicator, and the image of a point carried by a deformable structure. One element of said deformable structure is automatically actuated synchronously with the displacements of the above mentioned movable member, while other elements are adjusted in accordance with the value of flight factors (altitude, speed of the aircraft) and with the value of the drag coefficient of the object to be dropped from the aircraft. With this arrangement the point of the ground indicated by the position of the image of the movable point above referred to on the image of the ground, shows the point where the object would strike the ground if released at the very time when the observation is made.

Other features of the present invention will be apparent from the following detailed description of some specific embodiments thereof.

Preferred embodiments of the present invention will be hereinafter described with reference to the accompanying drawings, given merely by way of example, and in which:

Figs. 1 and 2 are diagrams, vertical and horizontal respectively, for explaining the invention.

Fig. 3 is a diagrammatic view of an apparatus embodying a portion of my invention.

Figs. 4 and 5 are an elevational view and a plan view respectively of a further form of apparatus for carrying out the invention, Fig. 5 being viewed along the line 5—5 of Fig. 4.

Fig. 6 is a detail view of the grid of Figs. 4 and 5.

Fig. 7 is a vertical section through another form of the invention.

Fig. 8 is a horizontal section of a portion of Fig. 7 substantially along the line 8—8 thereof.

Referring to Figs. 1 and 2, let us suppose that an airplane is traveling with a velocity V and is located at a point A at a distance $h^2$ above the ground. If a bomb is dropped from the plane, it would, in a vacuum, follow a path $p^1$ depending on the speed of the plane, this path being a parabola. If now the bomb is of a given shape, and assuming air resistance, the bomb will follow a different path $p^2$. These two paths meet the ground at $i^2$ and $i^4$ respectively, the distance between these two being represented by $d^2$. On the other hand, if the plane is at the height $h^1$, the two paths will cut the ground at $i^1$ and $i^3$ respectively, the distance between these two points $d^1$ being less than the distance $d^2$, since $h^1$ is less than $h^2$.

Considering the plan view shown in Fig. 2, and assuming that the airplane at A is traveling with a velocity V made up of two components $V_a$ due to the motor speed and $V_b$ due to the speed of the wind or drift, if an object is dropped at A without wind resistance it will fall at a point $i$ in the line V. The wind resistance will not cause the object to fall at a point backwards along the line V by the distance $d$, but instead the object is presumed to fall backwards from the point $i$ at a point $i'$ on a line passing through $i$ and parallel to the line $V_a$ (which represents the direction of the longitudinal axis of the plane). It is the subject of the invention to determine the location on an image of the landscape of the point $i'$.

Referring now to Fig. 3, which shows a mechanism for determining the drift, 11 is an objective which, through prisms 14 and 15, which represent "Porro" combinations, produces an erect image of the landscape on the plane surface of a field lens 12. This surface may be either rough (as in a photographic camera) or polished, this being preferable for night flying as in such a case the image is not visible on a rough surface. The focal length of the field lens is equal to the optical distance between the lens and the exit pupil of the objective 11. The correcting lens 13 above the lens 12 serves to form the image of the pupil in the eyes of the observer. Its focal length is therefore equal to the distance between the lens and the eyes of the observer, and its optical axis passes between the eyes. Obviously these two lenses may be combined in any suitable fashion, as long as the image is formed in the eyes of the observer.

The objective 11 is formed of anastigmatic lenses of large aperture, so as to permit the observer to move slightly without impairing the quality of the image. The focal length should be such that the magnification is at least equal to 1 so that the observer will have the impression of a normal view of the landscape. The objective has the Petzval curvature correction, so as to compensate for the curvature of the field introduced by the lenses 12 and 13.

On the plane surface 13' of lens 13 is also projected the image of a plate 16 showing, on a dark background, transparent parallel lines as shown by Fig. 6. This projection is obtained through an objective 17, a prism 18, a light condenser 19 and a lamp 20. This lamp can be switched on or off by means of switch 21, and its luminous intensity can be adjusted, through rheostat 22, according to the brilliancy of the landscape seen through the apparatus.

This plate 16 is rotatable about the optical axis of objective 17. This movement is controlled, for instance through a knob 24. Consequently, the observer, who is seeing the landscape through the apparatus, can turn the luminous grid of plate 16 into a position such that the parallel lines are parallel to the movement of any fixed point of the landscape across the field of the apparatus. The angle of drift can then be read from the stationary circular scale 23 (Fig. 3), which is, for instance rigidly fixed to condenser 19, the image of said scale being also projected on surface 13'.

The same apparatus can serve to measure the speed of the aircraft with respect to the ground. For this purpose, two lines 25 (Fig. 6) are traced at right angles to the parallel lines of the grid and it is possible to measure the time elapsing between the passage of a point of the landscape across these two lines. The altitude being known, the speed of the aircraft can easiy be calculated.

In the form of Figs. 4 and 5, the lenses 11, 12 and 13 and the prisms 14 and 15 serve to form an image of the landscape in the same manner as do the devices shown in Fig. 3. The prism device 40 (Fig. 4) serves to superimpose, on the image of the landscape, images of the drift grid 16' and the spot producing means 39'. It is to be understood that the position of the prism device 40 with respect to the drift grid 16' and the spot producing means 39' is such as to direct their entire images to the lens 12.

In the above-mentioned embodiment illustrated in Figs. 4, 5, and 6 the disc 33 carries the luminous slot or equivalent means 29 and the spot producing means 39'. This latter means 39' is slidably carried by an arm 37 pivoted at one end to a slide 38 supported in a slot provided in the spoke or radial web 34 and the disc 33. The opposite end of the arm 37 is pivotally secured to one end of the link or arm member 36. The opposite end of this last-named link or arm 36 is slidable with respect to a second arm 35 (which arm is fixed in position wtih respect to the aircraft and parallel with the fore and aft direction thereof) and adjustable with respect thereto (Fig. 5), as described in detail in the description of Figs. 7 and 8

The disc 33 is provided with peripheral gear teeth which are operatively connected through the manually operable worm screw means 32 with similar peripheral gearing provided on the drift gear 16' in such manner that they are adjusted simultaneously by rotation through the worm screw means 32.

In the embodiment of Figs 7 and 8, which is somewhat less diagrammatic, the same elements as above described are included. Disc 33 is replaced by a sector 33a. The grid 16' is located in a plane at right angles to said sector. The slidable arms 34 and 36 consist of racks slidable respectively in sector 33a and in a member 60, both pivoted to the frame 68 of the apparatus by means of stationary plate 49 of frame 68 and spindles 69 and 71, which are rotatable with respect to the frame 68 and the plate 49. These racks 34 and 36 mesh respectively with pinions 50 and 51 rigid with pinions 52 and 53 respectively. Pinions 50 and 52 are fixed to the spindle 69 upon which the member 60 is pivoted while pinions 51 and 53 are fixed to spindle 71 upon which the sector 33a is pivotally supported; both spindles 69 and 71 are rotatable freely in the frame 68 as pointed out above. Both of these pinions 52 and 53 are in mesh with a common toothed wheel 54 keyed on a spindle 55 mounted in frame 68 and connected, through pinions 56 and 57, with an operating knob 58. The simultaneous control of drift grid 16' and sector 33a is effected through knob 26a rigid with a spindle 72 operatively connected, through suitable pinions 73 and 74, with said grid and said sector. Pinion 73 meshes with the peripheral teeth on sector 33a and pinion 74 meshes with like gearing provided on the drift grid 16'. Both pinions 73 and 74 are fixed to the spindle 72.

The image of the landscape is given through objective lens 61, field lens 64' and lens 64. The image of grid 16' is superposed on this image of the landscape owing to the provision of semi-transparent mirrors 62 and 63 (the image of grid 16' being obtained through reflection on mirror 63).

The spot on the ground on which the bomb is presumed to fall is represented by a suitable small opening 66 in a box 65 which is mounted on the arm 37 of the parallelogram and is preferably movable lengthwise of this arm. The image of this opening is superposed on the image of the landscape through a reflection by mirrors 62 and 63.

While I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. An apparatus for use on an aircraft for determining at any instant of time the point upon the ground where an object dropped at that instant from said aircraft will strike, comprising optical means producing an image of the landscape, optical means determining the angle of side drift of said aircraft, a movably mounted spot producing means, and means interconnecting said optical drift determining means with said spot producing means for moving said spot producing means, and means for superposing on said landscape image the image of the spot from said spot producing means, so that movement of said drift indicating means will cause the image of the spot to be projected upon the landscape image at a point representing the point of impact of a projectile upon the ground, when dropped from the aircraft at that instant of time.

2. An apparatus for use on an aircraft for determining at any instant of time the point upon the ground where an object dropped at that instant from said aircraft will strike, comprising optical means producing an image of the landscape, means determining the angle of side drift of said aircraft, an arm extending parallel to the forward and aft direction of the aircraft and displaceable therefrom in accordance with said angle of drift determined by said determining means, a spot producing means adjustable upon said arm in accordance with flight factors and the drag coefficient of the object to be dropped, and means superposing a spot from said spot producing means upon said image of said landscape.

3. An apparatus for use on an aircraft for determining at any instant of time the point upon the ground where an object dropped at that instant from said aircraft will strike, comprising optical means producing an image of the landscape, a grid for determining the angle of side drift of said aircraft, optical means producing an image of said grid upon said landscape image, an arm extending parallel to the forward and aft direction of the aircraft and displaceable in accordance with the determined angle of drift, a spot producing means adjustable upon said arm in accordance with flight factors and the drag coefficient of the object to be dropped, and means superposing a spot from said spot producing means upon said landscape image.

4. An apparatus for use on an aircraft for determining at any instant of time the point upon the ground where an object dropped at that instant of time from said aircraft will strike, comprising optical means producing an image of the landscape, an arm rotatable about an axis, said arm being angularly displaced an amount dependent upon the side drift of said aircraft, a second arm having one end pivotally mounted upon said first named arm, means maintaining said second arm parallel to the fore and aft direction of the aircraft and spaced from said vertical axis a distance determined by the angle of drift of said aircraft, a spot producing means located upon said second arm in accordance with flight factors and the drag coefficient of the object to be dropped, and means superposing a spot from said spot producing means upon said landscape image.

5. An apparatus as in claim 4, rotatable grid means for determining the angle of drift of said aircraft, means producing an image of said grid upon said landscape image, and means for angularly displacing said first named arm upon rotation of said grid.

6. An apparatus for use on an aircraft for determining at any time the point on the ground where an object dropped at that time from said aircraft will strike the ground, which comprises, in combination, optical means for producing an image of the landscape, an arm rotatable about an axis, a second arm connected to said first arm by a pivot, said pivot being slidable along said first arm radially with respect to the axis of rotation of said first arm, means for adjusting the angle rotation of said first arm about its axis of rotation in accordance with the angle of side drift of said aircraft, means for maintaining said second arm parallel to the fore and aft direction of said aircraft, a spot producing means movable along said second arm in accordance with altitude and speed of the aircraft and the drag coefficient of the object to be dropped, means for supporting an image of the spot formed by said spot producing means upon said image of the landscape so that said image of the spot represents upon said image of the landscape the point on the ground which said object will strike when dropped at said time.

7. An apparatus for use on an aircraft for determining at any time the point on the ground where an object dropped at that time from said aircraft will strike the ground, which comprises, in combination, optical means for producing an image of the landscape, a drift grid for determining the angle of drift of said aircraft, means for superposing an image of said drift grid upon said image of the landscape, an arm rotatable about an axis, a second arm connected to said first arm by a pivot, said pivot being slidable along said first arm radially with respect to the axis of rotation of said first arm, means controlled by the rotation of said grid for rotating said first arm about its axis in accordance with the angle of side drift of said aircraft, means for maintaining said second arm parallel to the fore and aft direction of said aircraft, a spot producing means movable along said second arm in accordance with altitude and speed of the aircraft and the drag coefficient of the object to be dropped, means for superposing an image of the spot formed by said spot producing means upon said image of the landscape so that said image of the spot represents upon said image of the landscape the point on the ground which said object will strike when dropped at said time.

ISAAC KITROSER.